Figure 3:
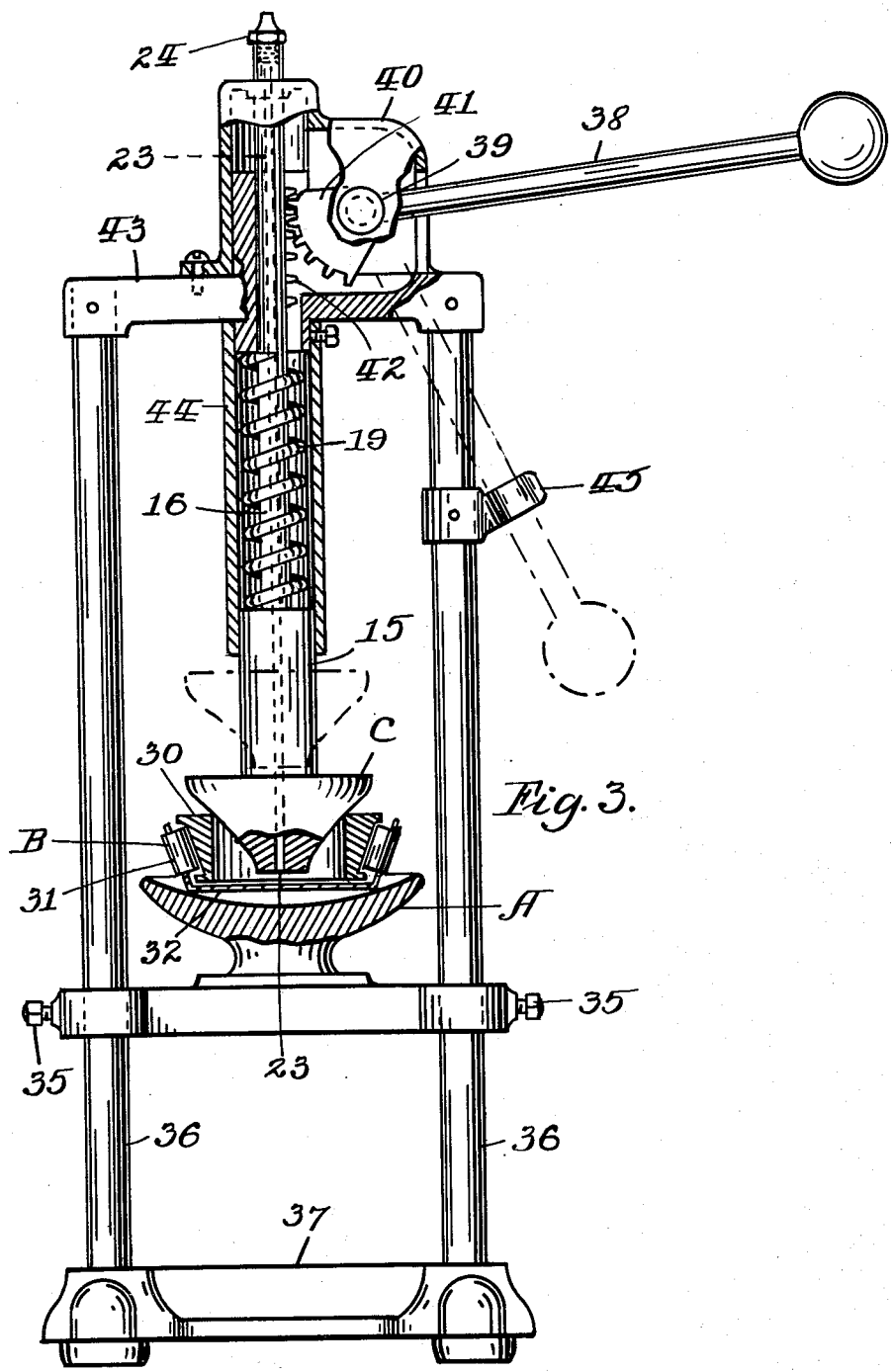

July 15, 1941.  H. S. BERG  2,248,940
BEARING PACKER
Filed July 3, 1939  2 Sheets-Sheet 1
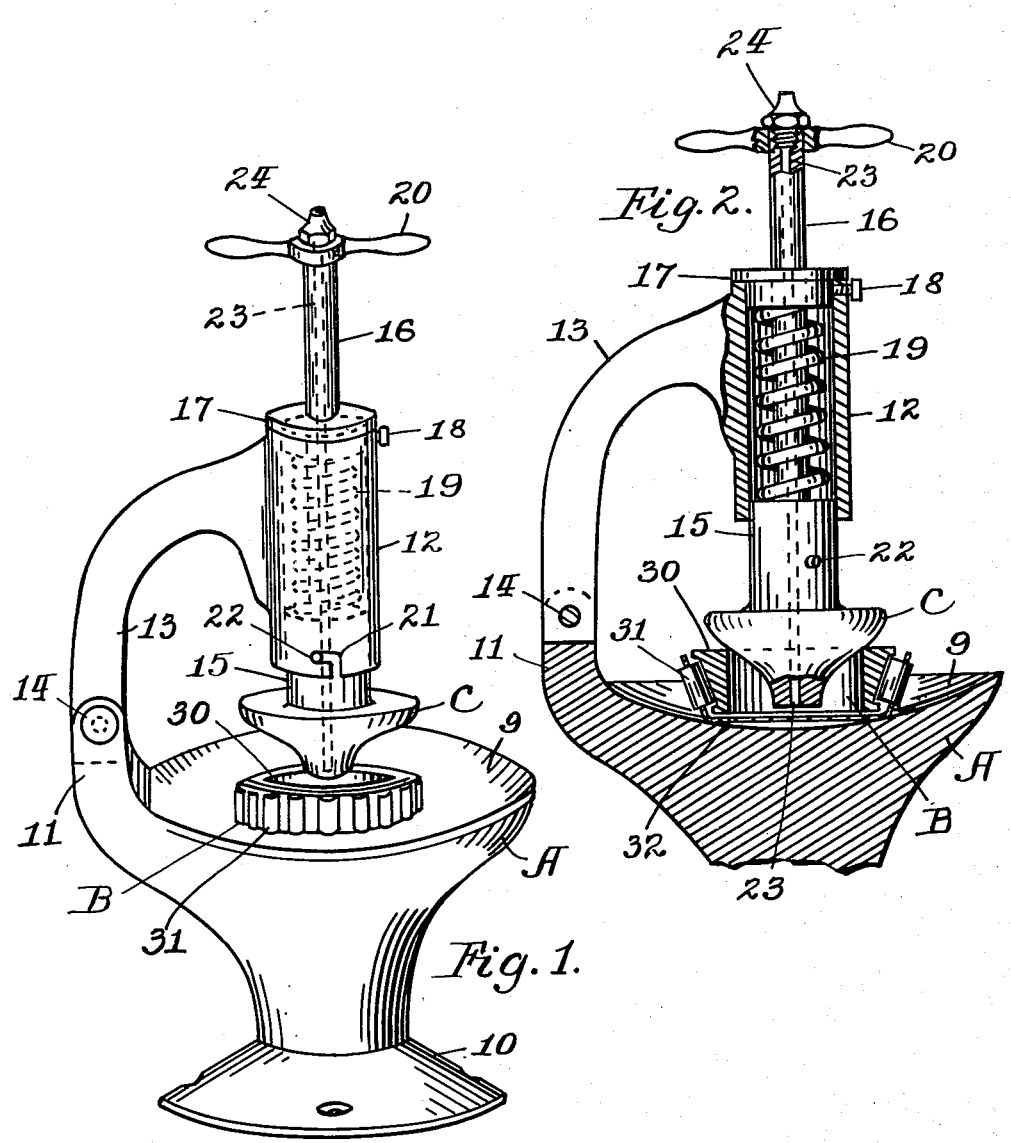
INVENTOR.
Hans S. Berg,
BY
ATTORNEY.

Patented July 15, 1941

2,248,940

UNITED STATES PATENT OFFICE 2,248,940

BEARING PACKER

Hans S. Berg, Claremont, Calif.

Application July 3, 1939, Serial No. 282,669

5 Claims. (Cl. 184—1)

My invention relates to the art of lubricating bearings and more particularly to an improved bearing packer for packing roller and ball bearings with a semi-solid lubricant. The primary object of my invention is to provide simple and inexpensive improved means for easily and quickly lubricating bearing assemblies of any usual size or construction substantially without waste of lubricant. A further object is to provide means for quickly and effectively clamping a bearing assembly to be treated in a holder so that fresh lubricating medium can be injected into the bearing while the bearing is simultaneously purged of old lubricant. A further object is to prevent waste of lubricant and to enable the operator to use the lubricating device without soiling the hands and clothing.

As is well known, roller bearing assemblies consist of an inner ring having equally spaced rollers held thereon by means of an outer retaining ring or cage. Likewise ball bearing assemblies usually are of similar construction. In the care of automobile front wheel bearings and other bearings where bearing assemblies are used the usual method of applying lubrication has been to force grease or other semi-solid lubricant either by hand or by the use of packing devices between the rollers or balls before or after the bearing is applied in use. With my invention the semi-solid lubricant is applied under pressure while the bearing is out of use. The bearing, of roller or ball type, is held firmly in a bowl below a readily manipulated nozzle whereby a leak proof connection is made with the bearing while the hands of the operator are left free to apply lubrication under pressure to effectively pack the bearing.

In the accompanying drawings forming part of this specification, Fig. 1 is a perspective view of my improved packer; Fig. 2 is a vertical central section through a portion of the structure shown in Fig. 1, and Fig. 3 is a front elevation partly in central vertical section of an alternative construction of my invention.

The form of my invention chosen for illustrating it as shown in the drawings is designed particularly for packing the front wheel bearings of automobiles. In the drawings A indicates a shallow annular bowl which forms a seat in which a bearing assembly B of any size, within the range of the apparatus, may be received and is held while being lubricated. This bowl has a base 10 for supporting the bearing assembly and a laterally extending supporting member 11. A vertical cylindrical guide 12 above the bowl and coaxial therewith has an arm 13 at its side extending downwardly and rigidly attached to the support 11 by the bolt 14 or any other suitable means. This arm and support may be integral when desired. A plunger 15 is reciprocably held in the cylindrical guide 12 and is provided with a downwardly directed tapering nozzle C on its lower end and a stem 16 on its upper end which projects above the sleeve 12 and slides through a bushing 17. Said bushing is seated in the upper end of the sleeve and is held firmly in place by the set bolt 18 or by any other suitable means desired. A coil expansion spring 19 encircling the stem in the guide and interposed between the upper end of the plunger 15 and the lower end of the bushing tends to urge the nozzle downwardly and handle flukes 20 mounted upon the upper end of the stem 16 enables the operator to raise the nozzle C out of cooperative position engaging the bearing assembly. A bayonet joint formed by the angle groove 21 in the lower end of the guide 12 and the companion pin 22 on the side of the plunger 15, serves to catch and hold the nozzle element in superior position (see Fig. 1) against the tension of spring 19. Any other suitable means for holding nozzle C in superior position free from the bearing assembly may be used. A duct 23 throughout the length of the stem 16, plunger 15 and nozzle C provides means by which lubricant of any type can be projected downwardly into the bearing assembly B. For connecting a source of lubricant to duct 23, a lubricant supply adapter 24 of usual construction is shown threaded into the upper end of the stem 16. The use of any other suitable lubricating supply connection is contemplated within the spirit of the invention.

The bearing assembly B as shown (see Fig. 2) is of usual construction and of roller type. It consists of an inner annular supporting ring 30, an annular series of antifriction rollers 31, and an outer concentric spacing ring 32. These elements form a bearing annulus. Any other desired type of usual construction forming a bearing annulus may be packed with lubricant by the use of my improvement.

In use the bearing assembly such as B is placed in the bowl A, near its center with the lower edge of the outer spacing ring 32 resting on the inwardly sloping shallow concave floor 9 as shown in the drawings. The bearing assembly nozzle C is then released from engagement with the bayonet joint and lowered with its tapering surface resting tightly on the upper edge of the inner supporting ring 30 of the bearing assembly. In this position the opposite ends of the outer and inner bearing rings 32 and 30 are closed tightly respectively by the concave floor of the bowl and the downwardly tapering surface of the nozzle. Lubricant of suitable type which usually is in semi-solid state is injected under pressure by applying a suitable source of lubricant supply to the nozzle C. The lubricant thus supplied is forced into the bearing by the nozzle and outwardly between and around the bearing rollers while any worn residual lubricant in the bearing is simultaneously expelled. Fresh lubricant thus supplied is uniformly distributed throughout and packed solidly in the bearing in and around the antifriction members thereof. The lower conical end of the nozzle C occupies part of the space within the inner supporting ring 30 and thus reduces the amount of lubricant necessary to thoroughly pack the bearing assembly. The mechanism of the device automatically adapts the structure so as to pack bearings of any height or diameter within the range for which the device is designed.

In the alternative construction shown in Fig. 3, the bowl A for supporting the bearing and the nozzle C are present as in the construction above described. The bowl, however, is selectively positioned vertically below said nozzle by slidably mounting and selectively securing it by set bolts 35 or other suitable means upon a pair of vertical supporting rods 36 which in turn are mounted upon a base 37. This adjustability provides for variation in pressure applied by the nozzle C upon the inner supporting ring 30 of the bearing and also assists in regulating the space between the bowl and nozzle to accommodate different heights of bearings which are being packed. Also the stem 16 instead of being manipulated by the hand operable flukes 20 is raised by means of a lever handle which is provided with a toothed quadrant 41 on its inner end, the teeth of which engage rack teeth 42 on the side of the stem 16. The cylindrical casing 44 in which the plunger 15 carrying the nozzle C reciprocates is rigidly mounted upon the upper yoke 43 which in turn is secured on the vertical supporting rods 36. Instead of releasibly holding the nozzle in raised position (see broken line position in Fig. 3), by a bayonet joint as shown in Fig. 1, it is secured when raised by the handle 38 swinging down and engaging a spring clip 45 on one of the supporting rods 36. The nozzle and bowl in the alternative construction cooperate with the bearing assembly substantially in the same manner as in the preferred construction above described.

In accordance with the patent statutes, I have described the principles of operation of my invention together with the apparatus which I now consider to represent the best embodiment thereof, but I desire to have it understood that the structure shown is only illustrative and that the invention can be carried out by other means and applied to uses other than those above set forth within the scope of the following claims.

I claim:

1. A bearing assembly lubricating packer, comprising, in combination, a bowl having a shallow inwardly sloping floor, a vertical guide supported by said bowl coaxial therewith, a plunger reciprocable longitudinally in said guide having a stem projecting above the guide and a nozzle on its lower end adapted in its lowered position to engage and close the upper end of the inner ring of a bearing assembly and hold the bearing assembly with its outer spacing ring tightly seated upon said floor, resilient means within said guide for urging the plunger with its nozzle downwardly, said plunger, nozzle and stem being passaged longitudinally for injecting lubricant under pressure downwardly into the space within the bearing in said bowl, and means cooperating with said stem for raising the nozzle above the bearing in said bowl.

2. In a structure as defined in claim 1, the plunger being provided with releasable means for holding the nozzle in superior position out of contact with the bearing assembly in the bowl.

3. In a structure as defined in claim 1, the guide and plunger being provided with a bayonet joint by which the nozzle may be releasably held in raised position out of contact with and above the bearing assembly in the bowl.

4. A bearing assembly lubricating packer, comprising, a bowl having a shallow inwardly sloping floor, an upwardly extending guide above the bowl coaxial therewith, a plunger reciprocable longitudinally in said guide having a stem projecting upwardly from the guide and a nozzle on its lower end adapted in its lowered position to engage and close the upper end of the inner ring of a bearing assembly and hold the bearing assembly with its outer spacing ring tightly seated upon said floor, resilient means cooperating with the guide for urging the plunger with its nozzle downwardly, said plunger, nozzle and stem being passaged longitudinally for injecting lubricant under pressure downwardly into the space within the bearing in said bowl, and means cooperating with said stem for raising the nozzle above the bearing in said bowl.

5. In a structure as defined in claim 4, means being provided for holding the plunger with the nozzle in superior position above the bowl.

HANS S. BERG.